United States Patent
Klein et al.

(10) Patent No.: US 11,212,118 B2
(45) Date of Patent: Dec. 28, 2021

(54) METHOD FOR CHECKING THE DATA TRANSPORT ACROSS A FIRST COMMUNICATION CONNECTION BETWEEN TWO DATA PROCESSING DEVICES, SAID FIRST COMMUNICATION CONNECTION BEING REALIZED BETWEEN TWO FIRST INTERFACE UNITS, AND MOTOR VEHICLE

(71) Applicant: AUDI AG, Ingolstadt (DE)

(72) Inventors: Markus Klein, Pförring (DE); Kamil Zawadzki, Munich (DE); Changsup Ahn, Ingolstadt (DE); Michael Schmailzl, Kösching (DE)

(73) Assignee: AUDI AG, Ingolstadt (DE)

( * ) Notice: Subject to any disclaimer, the term of this patent is extended or adjusted under 35 U.S.C. 154(b) by 171 days.

(21) Appl. No.: 16/627,622

(22) PCT Filed: Jun. 18, 2018

(86) PCT No.: PCT/EP2018/066076
§ 371 (c)(1),
(2) Date: Dec. 30, 2019

(87) PCT Pub. No.: WO2019/020276
PCT Pub. Date: Jan. 31, 2019

(65) Prior Publication Data
US 2020/0351106 A1    Nov. 5, 2020

(30) Foreign Application Priority Data

Jul. 26, 2017   (DE) .................... 10 2017 212 809.7

(51) Int. Cl.
*H04L 9/32*        (2006.01)
*G06F 21/42*       (2013.01)
(Continued)

(52) U.S. Cl.
CPC ............ *H04L 9/3271* (2013.01); *G06F 21/42* (2013.01); *H04L 63/08* (2013.01); *H04L 63/18* (2013.01);
(Continued)

(58) Field of Classification Search
CPC . G06F 21/42; G06F 2221/2103; H04L 63/08; H04L 63/18; H04L 67/12; H04L 9/3271; H04W 12/06
(Continued)

(56) References Cited

U.S. PATENT DOCUMENTS 9,332,431 B2    5/2016  Reitsma et al.
2005/0228983 A1  10/2005  Starbuck et al.
(Continued)

FOREIGN PATENT DOCUMENTS

CN      102457380 B      2/2016
DE      102011015259 A1  12/2011
(Continued)

OTHER PUBLICATIONS

Petr Burian, 2016 IEEE, "Communication Stack for Generic Embedded Modular Control System" (Year: 2016).*
(Continued)

*Primary Examiner* — Khalil Naghdali
(74) *Attorney, Agent, or Firm* — Sterne, Kessler, Goldstein & Fox P.L.L.C.

(57) ABSTRACT

The application relates to a method for checking the data transport across a first communication connection between two data processing devices, said first communication connection being realized between two first interface units, wherein the payload to be transferred can be divided into payload blocks and there is at least one second communication connection between the data processing devices, which is established by means of second interface units, and
(Continued)

wherein, in order to implement a challenge-response authentication, a request requiring retrieval of randomly selected data units from identifiable, randomly selected payload blocks of the payload is sent as a challenge by an authentication unit to the first interface units by means of the second communication connection, an authentication assembly of each of the first interface units extracts the requested response data from the payload and transmits the same back to the authentication unit and a successful check is determined if the response data match.

15 Claims, 3 Drawing Sheets

(51) Int. Cl.
    *H04L 29/06*         (2006.01)
    *H04L 29/08*         (2006.01)
    *H04W 12/06*        (2021.01)

(52) U.S. Cl.
    CPC ............ *H04L 67/12* (2013.01); *H04W 12/06* (2013.01); *G06F 2221/2103* (2013.01)

(58) Field of Classification Search
    USPC ........................................................ 713/168
    See application file for complete search history.

(56) References Cited

U.S. PATENT DOCUMENTS

| | | |
|---|---|---|
| 2009/0196296 A1 | 8/2009 | Vachuska |
| 2009/0210707 A1 | 8/2009 | De Lutiis et al. |
| 2009/0327724 A1 | 12/2009 | Shah et al. |
| 2011/0247013 A1 | 10/2011 | Feller et al. |
| 2012/0093312 A1 | 4/2012 | Gammel et al. |
| 2014/0189809 A1 | 7/2014 | Koved et al. |
| 2016/0117501 A1 | 4/2016 | Ghose |
| 2017/0359724 A1 * | 12/2017 | Katsman ............... H04W 12/06 |

FOREIGN PATENT DOCUMENTS

| | | | |
|---|---|---|---|
| DE | 112013006286 T5 | 10/2015 | |
| DE | 102014011802 A1 | 2/2016 | |
| WO | WO-2009139465 A1 * | 11/2009 | ......... H04L 29/1232 |

OTHER PUBLICATIONS

Maxa et al., "Near Field Communication Interface fora Packet-Based Serial Data Transmission Using a Dual Interface EEPROM", 2015 IEEE 20th Conference (ETFA), pp. 1-4 (Year: 2015).*
International Preliminary Report on Patentability directed to related International Patent Application No. PCT/EP2018/066076, dated Jun. 26, 2019, with attached English-language translation; 12 pages.
International Search Report and Written Opinion of the International Searching Authority directed to related International Patent Application No. PCT/EP2018/066076, dated Sep. 10, 2018, with attached English-language translation; 22 pages.
Chinese Application No. 201880041933.1, Office Action dated Sep. 29, 2021; English Translation of Search Results from EPO Global Dossier, 15 pages.

* cited by examiner

METHOD FOR CHECKING THE DATA TRANSPORT ACROSS A FIRST COMMUNICATION CONNECTION BETWEEN TWO DATA PROCESSING DEVICES, SAID FIRST COMMUNICATION CONNECTION BEING REALIZED BETWEEN TWO FIRST INTERFACE UNITS, AND MOTOR VEHICLE

TECHNICAL FIELD

The application relates to a method for checking the data transport across a first communication connection between two data processing devices

BACKGROUND

The data processing systems of modern overall apparatuses which are to provide data processing functions are becoming increasingly complex and in many cases require a plurality of data processing devices which transmit payload among themselves in order to process them in different ways, for example to prepare them for further data processing devices, to generate control signals and/or to finally use the payload, which is valid, for example, in the case of display information as payload, which should be displayed on a display apparatus as a data processing device, such as a display. In addition to overall apparatuses in which the individual data processing devices are firmly associated with the system, in particular in a common unit, distributed data processing systems have already been proposed in which data processing devices can be assigned to different overall apparatuses. An example of this is, for example, the cooperative data processing between a mobile device, for example a mobile phone, and a motor vehicle. In this context, DE 10 2011 015 259 A1 proposes to establish a communication connection between the vehicle and the portable apparatus, whereby, first of all, an authentication of a host software application can take place across this communication connection, which is triggered by a challenge-response authentication process.

An overall apparatus in which a data transfer takes place between different data processing devices represents a modern motor vehicle. For example, there are a plurality of control devices as data processing devices which communicate with further control devices and/or functional elements of the motor vehicle. An important type of functional elements for motor vehicles are display apparatuses, in particular those on which a user expects information about the operation of the motor vehicle reliably and in a certain appearance, especially also information regarding the driving operation such as speeds, traffic situation data and the like. If, for example, a display is provided as the display apparatus and thus as the data processing device, the frames/image data to be displayed as payload are to be transmitted from the control device to the display apparatus across a communication connection, wherein usually fast data transmission paths and communication standards are used, for example LVDS connections (Low Voltage Differential Signaling). Interface units of the respective data processing devices, said interface units being configured as microchips, usually convert the image data into a suitable format to be transmitted. In the concrete example, such interface units may be formed, for example, as LVDS chips. In addition to this first communication connection, which is usually a high-speed and/or high-bandwidth formed between the described first interface units, data processing devices are often also connected via at least one second communication connection, which can be realized, for example, across a network, here a motor vehicle bus, in particular a CAN-Bus. In this way, less time-critical information can be exchanged, such as feedback from a displaying apparatus also designed as an operating device, in particular a touchscreen as a display apparatus. The second interface units assigned to the second communication connection are usually conventional network interfaces or bus interfaces. These can also be realized as a microchip or integrated circuit (ASIC).

Especially with displays, but also with other data transport in motor vehicles, there is partly the interest of third parties to turn into the payload stream or replace or change it with their own payload. For example, for a display apparatus of a motor vehicle, the previous control device supplying the image data to be displayed as payload could be at least temporarily separated from the display in order to supply it with another payload stream. For example, modified user interfaces or the like should be created in this manner. It can therefore be said that currently any display within a motor vehicle (or in other overall apparatuses) can also be addressed by third-party providers. It has already been proposed to encrypt image data as payload by the first interface unit, but here, for example, in the LVDS case, usually keys are used to which even such third party providers easily gain access.

On the part of the manufacturer of such overall apparatuses, especially motor vehicles, there is therefore the interest to avoid such unwanted access as much as possible. However, there is also the interest of reproducing only intended contents on display apparatuses used as data processing devices in motor vehicles, since the information presented may possibly be important for the assessment of the traffic situation by a driver, which may therefore affect safety aspects. In this case, ways have already been proposed to also authenticate image data, in particular video data, for example by using digital signatures or watermarking techniques, wherein variants based on artificial intelligence are also known. Overall, these have in common that a great deal of hardware and/or software for encryption and/or the respective calculation is necessary.

US 2009/0 210 707 A1 discloses an out-of-band authentication method and system for communicating over a data network. It is proposed to transmit a data stream from a sender across a first, in particular non-secure channel. The sender generates authentication data for the data stream, which are transmitted across a second, in particular secure, channel. The receiver checks the data stream based on the authentication data.

US 2005/0228983 A1 relates to a network page channel for a message board. A secure side channel is proposed to extend the message board protocol, which should be used alongside an unsecure legacy channel. The page channel can be used for hash data to verify legacy data sent across the legacy channel.

DETAILED DESCRIPTION

The application relates to a method for checking the data transport across a first communication connection between two data processing devices, said first communication connection being realized between two first interface units, wherein the payload to be transferred can be divided into payload blocks and wherein at least one second communication connection is present between the data processing devices, which is established by means of second interface units. The application further relates to a motor vehicle.

The data processing systems of modern overall apparatuses which are to provide data processing functions are becoming increasingly complex and in many cases require a plurality of data processing devices which transmit payload among themselves in order to process them in different ways, for example to prepare them for further data processing devices, to generate control signals and/or to finally use the payload, which is valid, for example, in the case of display information as payload, which should be displayed on a data apparatus as a data processing device, such as a display. In addition to overall apparatuses in which the individual data processing devices are firmly associated with the system, in particular in a common unit, distributed data processing systems have already been proposed in which data processing devices can be assigned to different overall apparatuses. An example of this is, for example, the cooperative data processing between a mobile device, for example a mobile phone, and a motor vehicle. In this context, DE 10 2011 015 259 A1 proposes to establish a communication connection between the vehicle and the portable apparatus, whereby, first of all, an authentication of a host software application can take place across this communication connection, which is triggered by a challenge-response authentication process.

An overall apparatus in which a data transfer takes place between different data processing devices represents a modern motor vehicle. For example, there are a plurality of control devices as data processing devices which communicate with further control devices and/or functional elements of the motor vehicle. An important type of functional elements for motor vehicles are display apparatuses, in particular those on which a user expects information about the operation of the motor vehicle reliably and in a certain appearance, especially also information regarding the driving operation such as speeds, traffic situation data and the like. If, for example, a display is provided as the display apparatus and thus as the data processing device, the frames/image data to be displayed as payload are to be transmitted from the control device to the display apparatus across a communication connection, wherein usually fast data transmission paths and communication standards are used, for example LVDS connections (Low Voltage Differential Signaling). Interface units of the respective data processing devices, said interface units being configured as microchips, usually convert the image data into a suitable format to be transmitted. In the concrete example, such interface units may be formed, for example, as LVDS chips. In addition to this first communication connection, which is usually a high-speed and/or high-bandwidth formed between the described first interface units, data processing devices are often also connected via at least one second communication connection, which can be realized, for example, across a network, here a motor vehicle bus, in particular a CAN-Bus.

In this way, less time-critical information can be exchanged, such as feedback from a displaying apparatus also designed as an operating device, in particular a touchscreen as a display apparatus. The second interface units assigned to the second communication connection are usually conventional network interfaces or bus interfaces. These can also be realized as a microchip or integrated circuit (ASIC).

Especially with displays, but also with other data transport in motor vehicles, there is partly the interest of third parties to turn into the payload stream or replace or change it with their own payload. For example, for a display apparatus of a motor vehicle, the previous control device supplying the image data to be displayed as payload could be at least temporarily separated from the display in order to supply it with another payload stream. For example, modified user interfaces or the like should be created in this manner. It can therefore be said that currently any display within a motor vehicle (or in other overall apparatuses) can also be addressed by third-party providers. It has already been proposed to encrypt image data as payload by the first interface unit, but here, for example, in the LVDS case, usually keys are used to which even such third party providers easily gain access.

On the part of the manufacturer of such overall apparatuses, especially motor vehicles, there is therefore the interest to avoid such unwanted access as much as possible. However, there is also the interest of reproducing only intended contents on display apparatuses used as data processing devices in motor vehicles, since the information presented may possibly be important for the assessment of the traffic situation by a driver, which may therefore affect safety aspects. In this case, ways have already been proposed to also authenticate image data, in particular video data, for example by using digital signatures or watermarking techniques, wherein variants based on artificial intelligence are also known. Overall, these have in common that a great deal of hardware and/or software for encryption and/or the respective calculation is necessary.

US 2009/0 210 707 A1 discloses an out-of-band authentication method and system for communicating over a data network. It is proposed to transmit a data stream from a sender across a first, in particular non-secure channel. The sender generates authentication data for the data stream, which are transmitted across a second, in particular secure, channel. The receiver checks the data stream based on the authentication data.

US 2005/0228983 A1 relates to a network page channel for a message board. A secure side channel is proposed to extend the message board protocol, which should be used alongside an unsecure legacy channel. The page channel can be used for hash data to verify legacy data sent across the legacy channel.

It is therefore an object of the application to provide a way to verify or authenticate the data transport between two data processing facilities, which is easy to implement, which can be limited to communication connections to be actually verified and which only requires low processing power.

To achieve this object, the application provides, in a method of the type mentioned at the outset, that a request is sent as a challenge using the second communication connection by an authentication unit to the first interface units, said request requiring retrieval of randomly selected data units from identifiable, randomly selected payload blocks of the payload in order to implement a challenge-response authentication, that an authentication assembly of each of the first interface units extracts the requested response data from the payload and transmits the same back to the authentication unit, and that a successful check is determined if the response data match.

The present application thus provides an easily implementable, scalable option for authenticating data contents, in particular image data, for example video streams. In a permanently installed system, i.e. an overall apparatus, the data transport between at least one pair of data processing devices can be checked, and thus it can be determined whether the data reaches the receiving data processing device unchanged. For this purpose, a special embodiment of a challenge-response authentication is proposed, which guarantees the plausibility of the successful data transmission of the payload by sampling as close as possible at the beginning and at the end of the first communication connection by means of a specially designed request ("Challenge"). The actual query of the data units to be reproduced here is clearly only possible, as long as the payload blocks and the data units are identifiable therein, wherein the actual complexity and security of the challenge is present in the unknown, random ad hoc selection of the queried data units, which is formed by means of a preferred authentication unit formed as a master unit, which may be part of one of the data processing devices. In order to avoid a simple tap and thus an easy way to generate the correct response data by a further computing device, for example of a third party, which also monitors the second communication connection, it is preferred in the context of the present application, moreover, to provide the requests to be transmitted across the second communication connection with an encryption, which is often already possible in modern overall devices, especially motor vehicles, in other words, the corresponding encryption means are present, preferably on the part of the second interface units. This will be discussed in more detail below.

A substantial prerequisite for the realization of the present application is that payload blocks are separable from each other in the payload stream, for example, in the case of video data, a frame start marker (frame start indicator) is present as frames for payload blocks, which can be used to authenticate the payload blocks and which allows the querying of data units within a specific payload block. It should be noted that this is already common in video data anyway, for example in the form of video synchronization signals (for example "Blank Lines"). Even when using a packet-based data transmission of the payload, a corresponding identifiability is already possible using the payload packets as payload blocks.

Since the implementation of the request, in other words, of the query operation of the data units, can be easily implemented by hardware, a cost-effective hardware modification of the first interface units is sufficient at this point simply by adding a corresponding authentication assembly. The authentication module can, for example, comprise corresponding switching elements that can be realized on a microchip as the first interface unit. In this case, no distinction must be made between transmitting first interface units and receiving first interface units, that is, for both cases the same authentication modules can be used as long as the position in the data processing chain is identical. The position in the data processing chain should be selected as close as possible to the actual data output on the first communication connection in order to be able to monitor the data transport of the payload as simple and as secure against threats as possible. Concretely, a hardware block for realizing the authentication device may be configured to transmit (TX) or receive (RX), or it may be provided that an RX subset and a TX subset are present for simultaneous transmission/reception.

By virtue of the procedure proposed according to the application, the permanently installed system of the overall apparatus, which contains the at least two data processing devices, is therefore monitored for data manipulation/data exchange on the first communication connections between the data processing devices provided for this purpose. Should the comparison of the response data fail, there are a variety of responses within the overall device, such as issuing warnings, disabling data processing equipment, and the like. The data manipulation/data exchange within overall apparatuses is detected in the context of the present application and thus prevented or at least made more difficult in a successful manner. Thus, the data quality of the payload can be ensured.

A substantial advantage of the procedure according to the application is its selectivity and scalability. If a plurality of data processing devices communicate the payload with one another in an overall apparatus, authentication does not necessarily have to take place for each pair of these data processing devices, but the authentication can be restricted to specific data transport paths by transmitting requests only to the corresponding first interface units of the corresponding data processing devices. In the case of the already mentioned encryption, corresponding encryption means and encryption measures must be provided only for data processing devices to be checked. For example, in motor vehicles as overall devices, a manufacturer can ensure the quality, automotive suitability, and a special "look and feel" on displays and/or other payloads.

It should also be noted at this point that the present application allows problem-free addition of further payload sources if these are integrated accordingly into the overall system. By appropriate configuration of the authentication unit, a variety of possibilities in the specific implementation and in permissible, switchable payload streams are present. For example, configurations may be chosen in which a particular displaying apparatus/display apparatus as a data processing device displays other contents for a certain time, it is possible to allow for displaying certain contents only in vehicles of a certain class while other vehicles can be excluded, and additional data processing devices, which are not provided as standard in motor vehicles, are allowed to import payload, for example, for motor vehicles to be designed as emergency vehicles as overall apparatuses and the like. In particular, with regard to the particularly preferred encryption provided on the second communication connection, the separation between the encryption (second interface unit) and the conversion of the query signal (first interface unit) is emphasized again. Encryption structures and possibly required keys are therefore provided outside the first interface unit, and therefore only have to be added to data processing devices that are actually to participate in the authentication, in which case the scalability can be defined using shared keys associated with groups that are provided independently of the first interface units.

As already mentioned, the present application can be used in particular for the authentication of image data, in particular video data, as payload, such that in an expedient embodiment one of the data processing devices is a control device and another data processing device is a display apparatus, wherein image data to be displayed as payload on the display apparatus are used. In the case of image data, it is known and also useful in the context of the present application to use the frame start indicator such that the image data can thus have separate payload blocks separated by frame start indicators or payload structures containing at least one payload block separated by frame start indicators. This allows the simple distinction of payload blocks and thus also provides a basis for their identification, which will be discussed in more detail below. LVDS can be used as the transmission standard of the first communication connection. In this context, the first interface units may be formed, for example, as LVDS chips, which are supplemented by the corresponding authentication assembly. Low Voltage Differential Signaling (LVDS) is an interface standard for high-speed data transmission commonly used for video interfaces.

It may also be expedient in general to implement the first interface units as microchips and the authentication assemblies as integrated circuits on the microchips. The authentication assemblies are thus integrated into the microchips, thus implemented as a functional unit with the corresponding other functional units on a common die. As an alternative to microchips, FPGAs and/or ASICs can also be used. An easy to implement modification compared to encryption measures is possible here.

An expedient concrete embodiment of the present application provides that the authentication assemblies have a cyclically resetting counter for the payload blocks, wherein the request relates to a group of payload blocks resulting from a counter pass, and their number within the group is used to identify the payload blocks. For one thing, while it is already expedient to have a counter in the authentication unit for the data units within a payload block in order to be able to correctly answer the requests, a preferred expedient development also provides for counting payload blocks and thus to create groups originating from counter passes=cycles of clearly identifiable payload blocks. In this way, for each counter pass ultimately a time window is created within which an authentication process can proceed in the manner described here. If, for example, image data, specifically video data, are considered to be frames and, for example, 512 frames are combined as payload blocks into a group of payload blocks which are numbered consecutively, time windows in the range of seconds can result. This proves to be particularly useful if the data transmission across the second communication connection is slower or additionally encrypted, since then a time buffer arises, which ensures the timely transmission of the request across the second communication connection. For payload blocks combined for a payload structure for different data processing devices, it may be sufficient for the transmitting data processing device to count the payload structures (which may also be correspondingly separable, for example by a superframe start indicator), since then each payload block contained therein is automatically numbered.

Thus, a particularly advantageous, concrete embodiment provides that the request is sent at the beginning of a new counter pass, whereby the range of possible payload blocks to be queried is restricted at the beginning of the group in such a way that the request reaches the authentication module before the first block number that can be queried is reached, and/or the range of possible payload blocks to be queried is limited to the end of the group such that the response data reaches the authentication unit before the beginning of a new counter pass. Because the times for compiling of inquiries, possibly for encrypting of queries and transmitting the requests to the first interface units are known or at least ascertainable, the requests can be specifically designed such that an authentication process can always take place safely within a counter pass and the requests can be answered and the answers can be obtained.

If, for example, the counter runs from 0 to 511, which may correspond, for example, to a time duration of approximately 8 seconds, it is conceivable to select the randomly selected block numbers of payload blocks to be sampled only between 64 to 447, such that, on the one hand, the query is timed to the more remote first interface unit, and on the other hand, the response data are returned in a timely manner to the authentication unit.

It should also be noted that, on the one hand, it is conceivable that the authentication unit, depending on where it is installed, knows even the times at which a new counter pass begins, which can also be realized on the basis of a corresponding signal from the authentication module to the authentication unit. However, other synchronization mechanisms can be used to achieve a time coincidence of transmitting the requests with the start of a counter pass. For example, a first test request can be sent out and it can be observed when the corresponding response signals arrive. If the test request hits the first interface units in different cycles, the response signals will arrive offset by one cycle, it being possible to conclude the now present start of a current cycle with the arrival of the temporally later response signal. The first response data can then be discarded after synchronization is achieved.

Frequently, payload blocks have areas for additional information which are therefore free of actual payload to be used, or payload structures, for example superframes, that are structurally payload-free areas. Within the scope of a further development of the present application, these areas can be utilized by writing identification data, for example a serial number/block number of a counter, on the part of the first interface unit of a transmitting data processing device in free areas of the payload of a payload block (or even a payload structure). This means, on the part of the authentication module, that a payload block can also be provided with identification data that can be used by the first interface unit of the receiving data processing device in order to correctly identify the payload block. In particular, the identification data may contain the number of blocks of the payload block determined by the counter. Free areas of a payload block can be, for example, so-called "blanklines" for frames/video data. If, as will be explained in more detail below, image data or general payload for several receiving data processing devices are combined in a common payload structure, for example a so-called "superframe", free spaces or free areas can also be created here which can be used to store further information. Although it is conceivable, especially in the case of serial transmission of the payload blocks, to simply count on both sides of the first communication connection and thus find matching payload blocks, a transmission error could then lead to a "desynchronization" of the respective counter, which can result in authentication failures. Therefore, the co-transmission of identification data determined by the authentication module itself represents a significant improvement in the robustness and reliability of the authentication described here.

As already indicated, a particularly preferred development of the present application provides that the transmission of the request between the second interface units is encrypted by means of a key stored in the latter. In this way, it is avoided that the request can be intercepted on the second communication connection to be used for at least one data processing device and that it can be answered accordingly when the payload is known. It is, as already mentioned, the possibility of responding to a request, which is advantageously feasible, with the authentication module clearly separated from the encryption means, which are provided in particular in the second interface unit. In this way, the basic possibility for answering inquiries by corresponding modification of the first interface unit can be created with little effort, while the complex encryption means only have to be provided by the data processing devices for which authentication is to take place. This improves, as already stated, the scalability of the authentication system. Since it is at least not completely impossible to intercept requests within a data processing device, an expedient development can provide that several overall apparatuses each having at least two data processing devices are operated, a different key being selected for each overall apparatus. For example, in motor vehicles as overall apparatuses, a motor vehicle-individual key can be provided, which makes manipulation even more difficult. Overall apparatuses, for example motor vehicles, will usually have more than two data processing devices, wherein authentication is not necessary for every combination of transmitting data processing device and receiving data processing device. In addition, the data processing devices may be connected in different topologies, in particular in regard to the first communication connection, such that it is entirely conceivable to transmit useful data for a plurality of receiving data processing devices jointly by a transmitting data processing device across a first interface unit and thus a first communication connection. In particular, star topologies are also conceivable. In this case, the authentication process described here, which is in any case preferably repeated, in particular cyclically, can be used for any combination of transmitting and receiving data processing device, wherein only a first communication connection is required between them (possibly also across at least one other data processing device) and a second communication connection, across which the requests can be sent, preferably in an encrypted manner. However, just when there are data processing devices connected in series and the payload along the row are sent out jointly by the transmitting data processing device, some special constellations may arise, which in the following should be addressed in the context of the application.

It can thus be provided that payload is sent to a plurality of receiving data processing devices across a common first interface unit by one of the transmitting data processing devices, wherein the data transport to a part of the receiving data processing devices to be checked is checked separately. This means that the data transport to specific receiving data processing devices can each be checked separately, wherein, in particular, the data transport to certain receiving data processing devices, as already discussed, can be excluded from the verification/authentication.

A further development provides that payload blocks for different data processing devices are sent together in a payload structure to be output by the transmitting data processing device, wherein requests to first interface units of receiving data processing devices relate to payload blocks to be assigned to this data processing device. For example, in the case of image data which are to be displayed on several display apparatuses as receiving data processing devices, their respective payload blocks (frames) can be combined to form a payload structure which can be referred to as a "superframe". Each of the receiving data processing devices can then take their corresponding payload block, so to speak, from the payload structure. Since the data transport to certain data processing equipment is to be checked, therefore, whether their payload was not manipulated or whether it even arrived, the queries are affected, which are expediently always addressed to the receiving data processing device payload blocks, to which the data transport should be checked. In this case, an embodiment can also provide that the payload structure is reduced by removing respective payload blocks in the assigned data processing devices in order, for example, to save bandwidth. In this context, the type of counting to query the correct data units may change. In the context of the present application, it is now preferred that the authentication unit knows and uses the change of the payload structure on the transmission path, just like the way in which the payload blocks are fed into the payload structure, in order to formulate the requests from the outset, such that the receiving data processing devices lead to the correct results in the corresponding authentication modules, especially if the payload structure has changed on the way to the data processing device. Preferably, therefore, it may be provided that, in particular when the payload structure is reduced by removing respective payload blocks in the assigned data processing devices, the request is formulated, taking into account payload structure information in the authentication unit describing a change in the payload structure on the transmission path and/or the provision of the payload blocks in the payload structure. In this way, it is considered, for example, that when receiving a data unit to be queried in a receiving data processing device, which was initially at a certain first position within the payload structure, it is located now at another, second position within the, for example, remaining, receiving portion of the payload structure, which is possibly reduced only to the payload block of the receiving data processing device.

In an alternative embodiment to such a serial transmission of payload blocks, the beginning of which is clearly ascertainable, a packet-based transmission of the payload across the first communication connection is also conceivable. Thus, it can be provided that payload blocks are used for their own, identifiable payload packets directed to the respective data processing units. Such payload packets usually already have a header anyway, in which identification information relating to the payload packet is stored. Of course, these identification data, which are present anyway, can also be used according to the application, for example, by eliminating the need for a counter in the authentication module or inscribing its contents therein.

In any case, it is expedient if, when using a counter in the authentication module, payload packets for different data processing units are each counted separately and/or a counter number (block number) is stored in a header of the payload packet. If a counter is therefore to be used, it is proposed to use a separate counter for each receiving data processing device and the corresponding assigned payload packets. With this approach, it is also possible to handle repetitions and permutations of payload packets.

In a change in the payload structure which is not known in the authentication unit in at least one data processing device lying between the originally transmitting data processing device and the ultimately received data processing device, it can be provided that each partial path is checked individually on the basis of corresponding requests. In this case, the request cannot be meaningfully formulated for the ultimately receiving data processing device, since the corresponding information is not present in the authentication unit, such that it is proposed to separately check the data transport over each partial path between the originally transmitting data processing device and the ultimately receiving data processing device, which is less preferred, however, because then, in particular in the embodiment with an encryption over the second communication connection, further encryption means are needed, which can bring effort and costs with it. Therefore, in the context of the present application, exemplary embodiments are preferred in which the authentication unit knows the form in which the payload is received and by which data processing device, in the form of payload structure information.

It should also be noted at this point that it is also conceivable to use the first communication connection bidirectionally. Then, if authentication of concurrent data transport is to occur in both directions, two logical instances of the authentication assembly are required. Depending on the configuration of the first interface units, the corresponding authentication modules can be provided once or twice, for example two identical subgroups in the RX path and in the TX path.

Preferably, a second communication connection formed in a network is used. For example, in motor vehicles as overall apparatuses, communication networks are usually present anyway, for example as CAN buses that connect various data processing units. These networks can now be used in the context of the present application to establish the second communication connection, which makes it possible to send the requests to all data processing devices concerned.

In an expedient embodiment, the authentication unit can be integrated into at least one second interface unit. In particular, if an encrypted transmission of requests takes place via the second communication connection, the authentication unit is a master unit, wherein corresponding slave units can be provided in request-receiving data processing devices, in particular their second interface units. These forward the decrypted request internally in the receiving data processing device to the first interface unit, specifically the authentication module.

If it is cyclically authenticated, for example during each of the named error cycles and/or every nth of the mentioned counter passes, it can be provided that an unsuccessful authentication or check is not established until a certain proportion of erroneous comparisons has occurred over several authentication processes. Different measures are conceivable in case of failure of the check, and thus upon detection of an authentication error, for example, the output of corresponding messages to a user, the deactivation of receiving data processing equipment and the like. In one embodiment, it is conceivable to refrain from querying the corresponding receiving data processing device in the event of a detected authentication error. The absence of these requests can be interpreted by the receiving data processing device as an indication of the authentication error, such that appropriate measures can take place there, such as a deactivation and/or output of clues.

As already mentioned, the present application can be used particularly advantageously in a motor vehicle as an overall apparatus, wherein it can then be provided that a particular transmitting data processing device is a control device of a motor vehicle as an overall apparatus and a particular receiving data processing device of a displaying apparatus, in particular a display apparatus of the motor vehicle.

Accordingly, in addition to the method, the present application also relates to a motor vehicle comprising at least two data processing devices between which a first communication connection is present, provided by first interface units of the data processing devices for data transport of payload, and a second communication connection, provided by second interface units of the data processing devices, wherein the payload to be transmitted are divisible into payload blocks, which is characterized in that an authentication unit is further provided in order to implement a challenge-response authentication, which sends a request requiring retrieval of randomly selected data units from identifiable, randomly selected payload blocks of the payload as a challenge to the first interface units by means of the second communication connection, and respectively an authentication assembly of each of the first interface units is provided which extracts the requested response data from the payload and transmits the same back to the authentication unit, wherein a successful check is determined by the authentication unit if the response data match. In other words, the motor vehicle according to the application is therefore designed as an overall device for carrying out the method according to the application. All statements to the method according to the application can be analogously transferred to the motor vehicle according to the application, with which therefore the already mentioned advantages can also be obtained.

Figure 1:
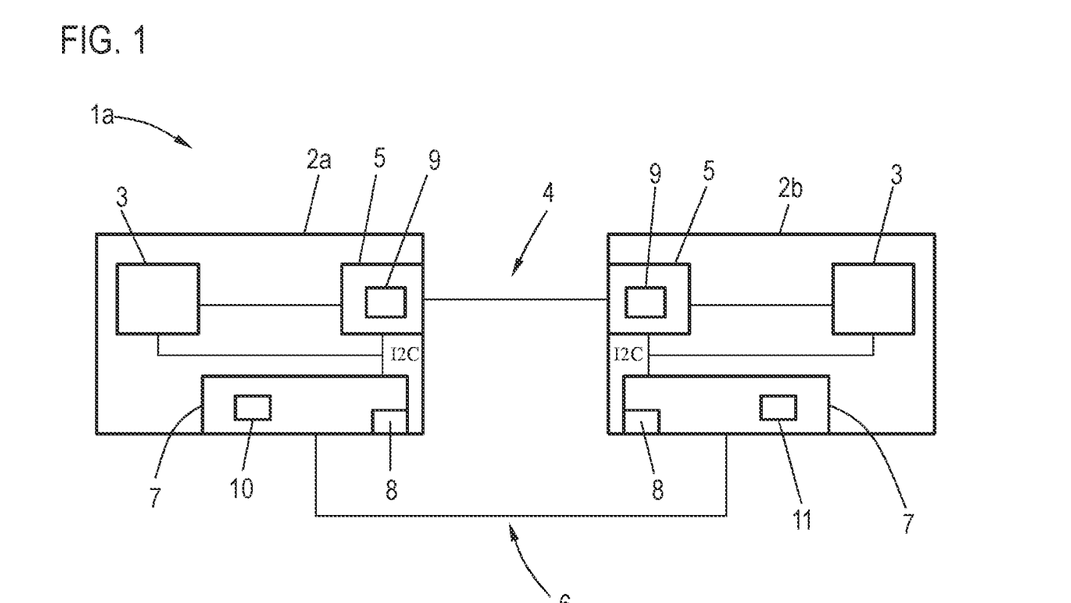
FIG. 1 shows a first, simple embodiment of an overall device.

Further advantages and details of the present application will become apparent from the embodiments described below and with reference to the drawings, which show:

FIG. 1 shows a first, simple embodiment of an overall device.

Figure 2:
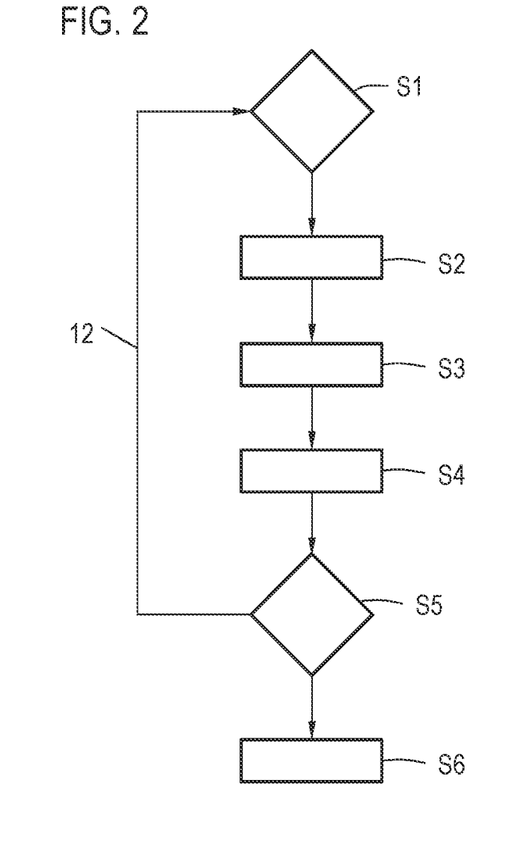
FIG. 2 shows a flowchart of an exemplary embodiment of the method according to the application.

FIG. 2 shows a flowchart of an exemplary embodiment of the method according to the application.

Figure 3:
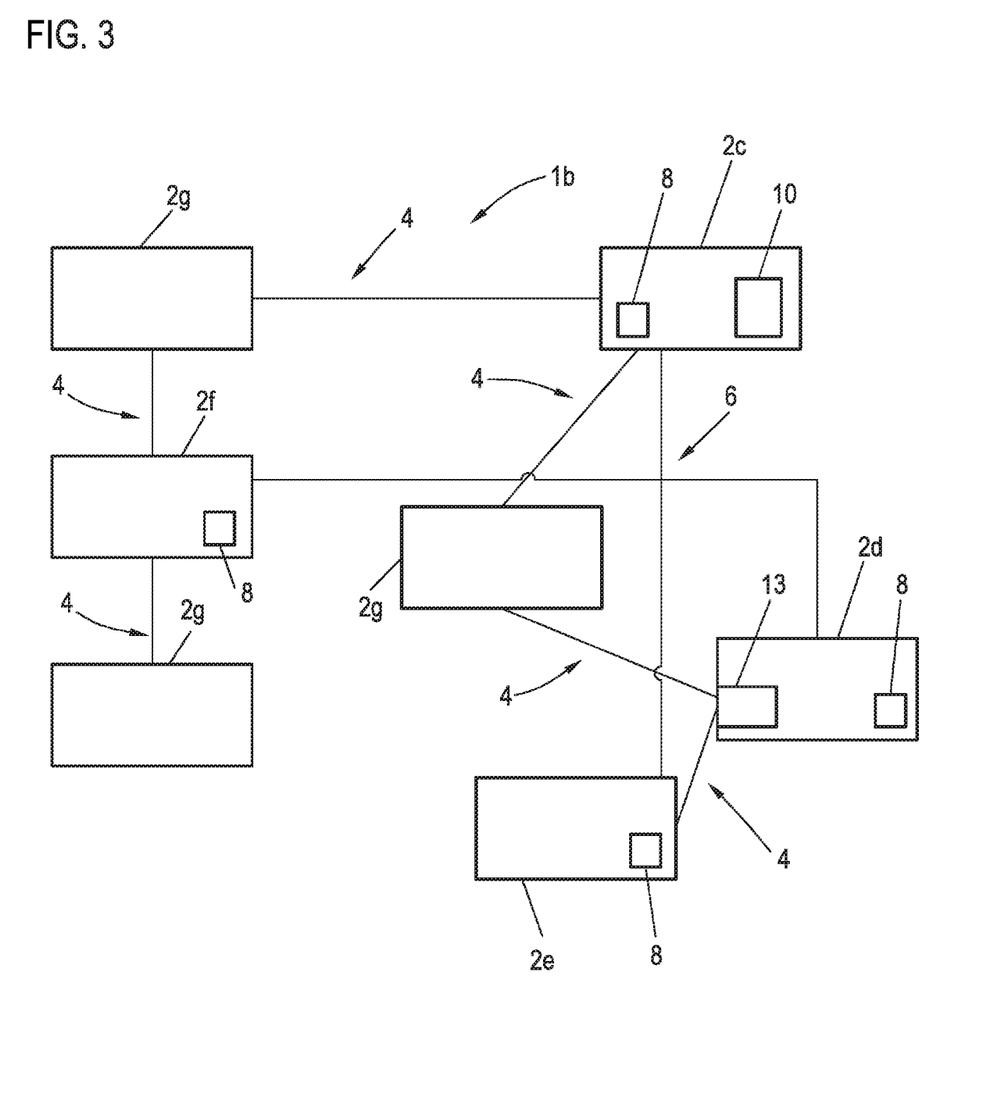
FIG. 3 shows a second embodiment of an overall apparatus.

FIG. 3 shows a second embodiment of an overall apparatus.

Figure 4:
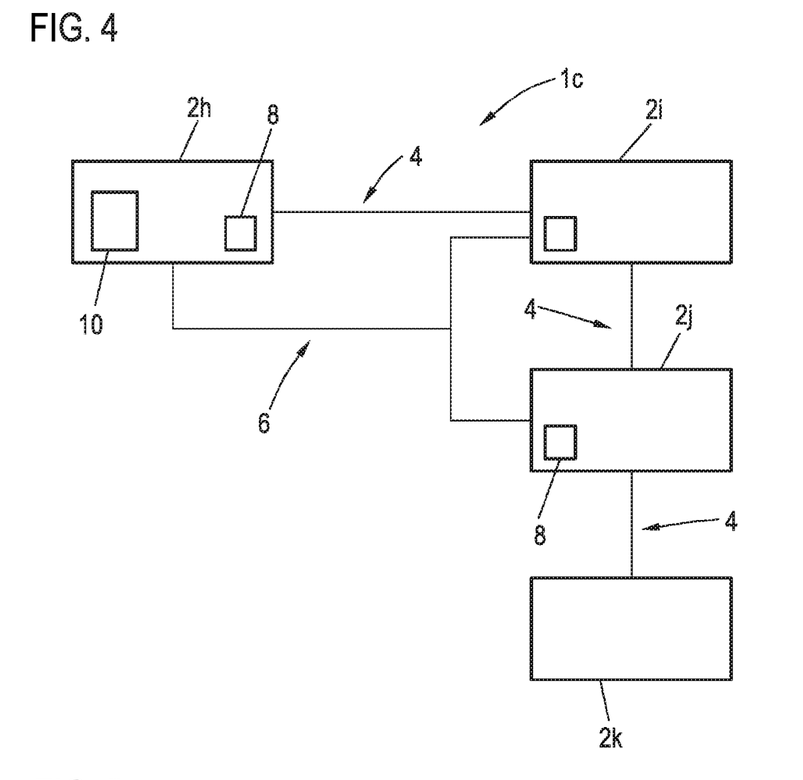
FIG. 4 shows a third embodiment of an overall apparatus.

FIG. 4 shows a third embodiment of an overall apparatus.

Figure 5:
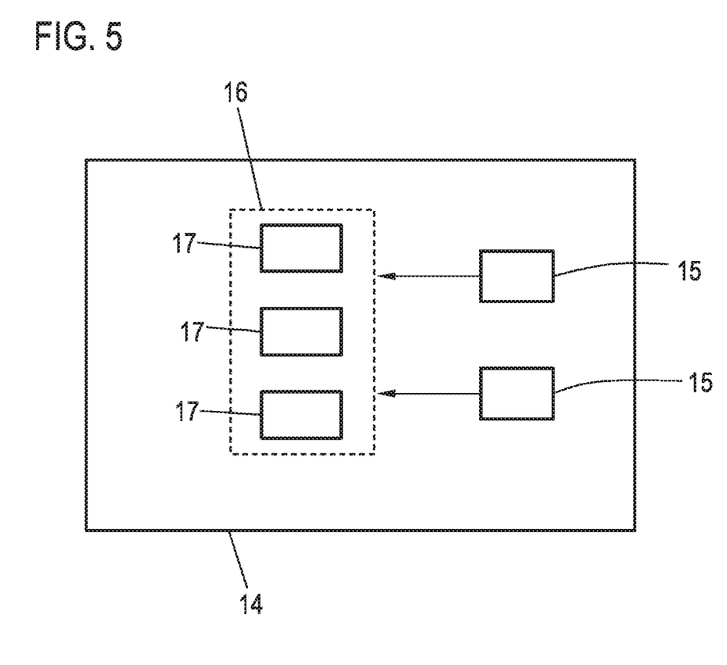
FIG. 5 shows a motor vehicle according to the application.

FIG. 5 shows a motor vehicle according to the application.

FIG. 1 shows a first, particularly simple configuration of an overall device 1a, which in this case has two data processing devices 2a, 2b to be analyzed closer. The data processing devices 2a, 2b each have a data processing unit 3, which will not be discussed in detail here. In this exemplary embodiment, the data processing device 2a is a control device, and the data processing device 2b is a displaying apparatus, specifically a display apparatus. Image data determined by the data processing device 2a, in this case video data, are to be displayed on a display of the display apparatus 2b, such that image data is to be transmitted from the transmitting data processing device 2a to the receiving data processing device 2b as payload across a first communication connection 4, here an LVDS connection. For this purpose, the data processing devices 2a, 2b have identically formed first interface units 5, which in the present case are designed as LVDS chips. Between the data processing devices 2a, 2b a further, second communication connection 6 is present, which can be part of a network as a CAN bus connection. Second interface units 7 allow the data communication across the second communication connection 6. The second interface units 7 are designed as basically known network input-output controllers. If, for example, the data processing device 2b comprises a touch-screen, corresponding operating data relating thereto can be transmitted to the data processing device 2a via the second communication connection 6.

In order to allow an encrypted transmission of information across the second communication connection 6, the second interface units 7 have corresponding encryption means, which are indicated here above the key 8.

In order to realize a low-cost authentication of the data transport via the first communication connection 4 from the data processing device 2a to the data processing device 2b, the first interface units 5 are now modified by the addition of an authentication assembly 9, which is integrated into the LVDS chip. Furthermore, an authentication unit 10 embodied as a master unit is integrated in the second interface unit 7 by the data processing device 2a, while the second interface unit 7 of the data processing device 2b has a corresponding slave unit 11.

The concrete implementation of an authentication process will be explained in more detail below with reference to FIG. 2. It should be noted beforehand that the payload is transmitted across the first communication connection 4 as payload blocks forming frames, wherein the beginning of a new frame is each marked by a frame start indicator and by the first interface unit 5, and thus the authentication assembly 9 can be seen.

The authentication assemblies 9 each have counters (not shown) which cycle through a counting range, for example from 0 to 511, and number the individual frames as payload blocks. Further counters in the authentication assembly 9 are able to read out certain data units, for example image values of specific pixels, in that the data units within the payload blocks can also be counted. A block number assigned by the counter from a transmitting data processing device, here the data processing device 2a, i.e. number of payload blocks, is written in a blank line of the respective payload block, i.e. frames, such that the block number on the part of the authentication assembly 9 of the receiving data processing device 2b is known undoubtedly and unambiguously. The block number can therefore be understood as identification data of the respective payload block.

Based on this knowledge and the basic structure of the payload sent, the authentication unit 7 can check the data transport from the data processing device 2a to the data processing device 2b, and thus monitor whether the data processing device 2b actually has the payload that has been sent out.

For this purpose, in a step S1, cf. FIG. 2, it is checked whether there is the beginning of a counter pass. For this purpose, a suitable synchronization mechanism can be used. If this is the case, in a step S2, the authentication unit 7 generates a request as a "challenge" of a challenge-response method, namely the reading out of a specific number of data units from a specific number of frames, i.e. payload blocks, within the current counter pass. The number of data units to be read out per payload block and the number of affected payload blocks can be configured; the larger their number, the more reliable the verification, but care must be taken to ensure that the effort and the latencies resulting from the data transmission are not too large. In the present exemplary embodiment, for example, eight payload blocks can be randomly selected by the authentication unit 7, from which in turn eight randomly selected data units (image values on pixels) are queried. In this case, the number of payload blocks to be randomly selected is limited to a subinterval of the respective counter pass, in the example 0 to 511, in such a way that the request reaches both first interface units 5 in time despite the transmission paths inside and outside the data processing devices 2a, 2b and the encryption taking place. For example, if the transmission of the 512 payload blocks takes place within eight seconds, the maximum time can be calculated for the transmission of the request to the first interface units 5, such that, for example, a restricted range for selecting the random payload blocks between 64 and 447 can result.

The selection of the challenge in step S2 does not necessarily have to take place after the start of the counter pass, but step S2 can also be before step S1. For example, it is also conceivable to pre-generate a certain number of challenges and to always send out one number at the beginning of a new counter pass. In this way, time can be gained after the start of the counter pass.

At the end of step S2 (or, if step S2 has already taken place before step S1, at the end of step S1), then the queries are sent to the interface units 5. In the example of FIG. 1, the request is placed within the data processing device 2a across an I2C line directly to the first interface unit 5; to the second data processing device 2b, the request is first encrypted by means of the key 8, sent via the second communication connection 6, decoded in the slave unit 11 and in turn forwarded via an I2C line to the first interface unit 5 and thus the authentication assembly 9.

If the request is received from the authentication assemblies 9, it is executed accordingly in a step S3 by waiting until said payload blocks (frames) appear, whereupon said payload units are queried therefrom, collected as response data and transmitted back to the authentication unit 10. In this case, in the transmission path across the second communication connection 6 (response data of the data processing device 2b), an encryption takes place again.

In a step S4, the response data of both authentication assemblies 9 are then compared. If these match, the check is positive, cf. step S5, and in a cyclic process can proceed to the next authentication process, cf. Arrow 12. If the comparison fails (which can also be monitored over several execution processes), a branch is made from step S5 to step S6, where suitable measures can be initiated. It should be noted that a measure may also provide to suppress requests to the second data processing device 2b in the future, from which it may conclude that the authentication has failed and that appropriate action can be taken there.

The cyclic requests act as a kind of "heartbeat", the absence of which gives the receiving data processing device 2b an indication that the received payload is not authentic.

Overall apparatuses have, for example, in a training as a motor vehicle, usually more than two data processing devices 2a, 2b. This results in more complex topologies, which, however, can also be tapped by the method according to the application.

Thus, within such topologies, a great variety of pairs of data processing devices 2a, 2b communicating with one another across the first communication connection 4 can be formed, between which the data transport can be checked in parallel or sequentially under the control of the at least one authentication unit 10.

FIG. 3 shows a first example of a possible system topology of an overall apparatus 1b. In the present case, the overall apparatus 1b comprises two data processing devices 2c, 2d designed as control devices, the data processing device 2d being added as an additional control device which is intended to provide temporary provision of video data as payload to the data processing device 2e designed as display apparatus. For the data processing device 2d to be integrated into the authentication processes, the correct key 8 is stored in it, wherein for the sake of simplicity the interface units 5, 7 and the slave units 11 are no longer shown here; the authentication unit 10 is presently integrated in the second interface unit 7 of the data processing device 2c. In order to be able to switch over between the data processing device 2c and the data processing device 2d as a data source for the data processing device 2e, the data processing device 2d has a switching device 13 (switch) for the first communication connection 4, wherein the switching device 13 can of course also be located differently.

Another display device to which the data transport is to be checked is the data processing device 2f. The data processing devices 2g are other display apparatuses for which authentication is not to be performed. Although they have the authentication assembly 9, since all first interface units 5 should be the same, said authentication assembly being cheap and easy to be implemented, the much more complicated encryption means are not required, which is why no key 8 is indicated there.

Starting from the data processing device 2c as a data source for payload, a tree topology is given with regard to the display apparatuses 2e-2g. In this case, payload for the various data processing devices 2e-2g lying along a common data transport path formed by first communication connections 4 are combined into payload structures whose beginning can be clearly identified by the authentication assemblies. In particular, so-called superframes may be used, in which the payload blocks for the individual data processing devices 2e-2g are contained, which lie along the same total distance. To reduce the data, the data processing devices 2e-2g can remove their respective payload blocks from the payload structure, such that a change in the payload structures occurs, which in turn has an influence on the meter reading for querying specific data units in payload blocks. However, these changes are known to the authentication unit 10, in which a payload structure information that describes this is stored accordingly. This means that despite the change in the payload structure, the requests can already be specifically formulated in such a way that the correct data units are queried.

In the present case, the second communication connection 6 runs via a network, namely a CAN bus system, as indicated accordingly, to which at least the data processing devices 2c, 2d, 2e and 2f are connected. In many cases, the data processing devices 2g will be connected, which is not shown here in detail.

In the embodiment according to FIG. 3, the data transport between the data processing devices 2c and 2f, 2c and 2e as well as 2d and 2e is now to be checked by corresponding authentication processes according to FIG. 2, for which corresponding requests are generated and sent across the second communication connection 6, encrypted corresponding to the key 8. The authentication processes can be parallel or serial. After the change of payload structures of the authentication unit 10 is known, the queries are immediately correctly formulated and, in the case of the data processing device 2f, 2d, in which a data processing device 2g is interposed along the first communication connection 4, said queries can be sent directly, without any further checks being necessary relating to the corresponding data processing devices 2g.

In this embodiment, the use of different keys 8 or key groups is particularly advantageous, in particular different keys for 2c-2f, 2c-2e and 2d-2e. For example, if the data processing device 2d originates from an external supplier, an internally used key 8 need not be shared with it. In particular, supplier-specific keys 8 can be provided in order to be able to assign "leaks" with regard to keys 8.

Also, for example, different keys 8 may be assigned to the compounds 2c-2f and 2c-2e, for example, different key strengths (cost control).

FIG. 4 shows a less preferred case of an overall apparatus 1c in which the authentication unit 10 in the data processing device 2h designed as a controller is not aware of the change of the payload structure along a chain comprising three data processing devices 2i, 2j, 2k designed as display apparatuses, but in which the data transport is to be authenticated to data processing device 2j. Since the change in the payload structure by the data processing device 2i is unknown, the data transport between the data processing device 2h and 2i and between the data processing device 2i and the data processing device 2j must be checked here, which is why encryption means are also required in the data processing device 2i.

Finally, FIG. 5 shows a schematic diagram of a motor vehicle 14 according to the application as an overall apparatus, in which different control devices 15 used as data processing devices provide image data, in particular video data, as payload, to a group 16 with different displaying apparatuses 17, of these display apparatuses, as further data processing devices, such as it is only indicated here. By appropriate configurations of the respective first interface units 5 with authentication assemblies 9, as well as the provision of an authentication unit 10 and the use of a CAN bus system as the second communication connection 6, authentication processes for the data transport to at least part of the display apparatuses 17 can be carried out. Topologies as in FIGS. 1, 3, and 4 can be used.

It should be noted that the authentication process described here can also be used in the case of packet-based transmission over the first communication connection 4; in addition, bidirectional data transport can be monitored in at least two logical authentication assemblies 9.

Incidentally, in the case of the motor vehicle 14, the key 8 is individualized by the motor vehicle, with the corresponding keys being able to be kept, for example, in a database of the manufacturer, in order to be able to provide the correct key in the case of a corresponding expansion by further data processing devices in which the data transport to be monitored. For example, it is possible to add control devices, which are checked and approved by the manufacturer, for special purposes, such as emergency vehicles.

The invention claimed is:

1. A method for checking a data transportation between a first data processing device and a second data processing device in an apparatus, the method comprising:
   sending, by the first data processing device, a transmitting payload to the second data processing device through a first communication connection, wherein the transmitting payload is divided into payload blocks and the first communication connection is realized between a first interface unit of the first data processing device and a first interface unit of the second data processing device;
   sending, by a first authentication unit of the first data processing device, a request to the first interface unit of the first data processing device, wherein the request requires data units in randomly selected positions of randomly selected and identifiable payload blocks;
   sending to the first interface unit of the second data processing device, by the first authentication unit of the first data processing device, the request through a second communication connection, wherein the second communication connection is realized between a second interface unit of the first data processing device and a second interface unit of the second data processing device;
   extracting, by a first authentication assembly of the first interface unit of the first data processing device, first response data from the transmitting payload based on the request;
   receiving, by the first authentication unit, the first response data from the first interface unit of the first data processing device;
   receiving, by the first authentication unit, second response data from the second data processing device, wherein the second response data is extracted by a second authentication assembly of the first interface unit of the second data processing device from a receiving payload based on the request; and determining, by the first authentication unit, a successful check result if the first response data match the second response data.

2. The method according to claim 1, wherein the first data processing unit is a control unit and the second data processing unit is a display apparatus, wherein the transmitting payload includes image data that are to be displayed on the display apparatus, wherein the image data have payload structures separated by frame-start indicators which form the payload blocks.

3. The method according to claim 1, wherein the first interface unit of the first data processing unit and the first interface unit of the second data processing unit are designed as microchips and the first authentication assembly and the second authentication assembly are integrated into the microchips.

4. The method according to claim 3, wherein the first and second authentication assemblies have cyclically resetting counters for the payload blocks, wherein the request is based on a counter pass, wherein the counter pass is generated from the cyclically resetting counters and used to identify the payload blocks.

5. The method according to claim 4, wherein the request is sent at a beginning of the counter pass, wherein the payload has a head section, a middle section and a trail section, and the counter pass indicates the payload blocks in the middle section, wherein the middle section is decided such that the request reaches the second authentication assembly of the second data processing device before a first payload block required by the request reaches the first interface unit of the second data processing device and the second response data reach the first authentication unit of the first data processing unit before an end of the counter pass.

6. The method according to claim 1, wherein identification data for identifying the payload blocks are written in free areas of the payload blocks.

7. The method according to claim 1, wherein the second communication connection is encrypted by means of a key stored in the second interface unit of the first data processing device and the second interface unit of the second data processing device.

8. The method according to claim 7, wherein the key is different from a second key used in a second apparatus having at least two data processing devices.

9. The method according to claim 1, further comprising:
sending, by the first interface unit of the first data processing device, the transmitting payload to a first interface unit of a third data processing device;
sending, by the first authentication unit of the first data processing device, a second request to the first interface unit of the first data processing device;
sending, by the first authentication unit of the first data processing device, the second request to the first interface unit of the third data processing device;
receiving, by the first authentication unit of the first data processing device, third response data from the first interface unit of the first data processing device based on the second request;
receiving, by the first authentication unit, fourth response data from the third data processing device based on the second request; and
determining, by the first authentication unit, a second successful check result if the third response data match the fourth response data.

10. The method according to claim 9, wherein the transmitting payload includes payload blocks associated with the second data processing device and payload blocks associated with the third data processing device, wherein the first request requires the payload blocks associated with the second data processing device and the second request requires the payload blocks associated with the third data processing device.

11. The method according to claim 10, further comprising:
removing, by the second data processing device, the payload blocks associated with the second data processing unit from the receiving payload to form a modified receiving payload;
sending, by the second data processing device, the modified receiving payload to a fourth data processing device;
generating, by the first data processing device, a third request based on the modified receiving payload; and
sending, by the first data processing device, the third request to the fourth data processing device.

12. The method according to claim 9, further comprising:
sending, by the second data processing device, a fourth request to the fourth data processing device if information of the modified receiving payload is not available to the first data processing device, wherein the fourth request is based on the modified receiving payload;
sending, by a second authentication unit of the second data processing device, the fourth request to the first interface unit of the second data processing device;
receiving, by the second authentication unit, fifth response data from the first interface unit of the second data processing device based on the fourth request;
receiving, by the second authentication unit, sixth response data from the fourth data processing device based on the fourth request; and
determining, by the second authentication unit, a third successful check result if the fifth response data match the sixth response data.

13. The method according to claim 1, wherein the first authentication unit is integrated in the second interface unit of the first data processing device.

14. The method according to claim 1, wherein the first data processing device is a control device of a motor vehicle and the second data processing device is a display apparatus of the motor vehicle.

15. A motor vehicle comprises a first data processing devices and a second processing device, wherein the first data processing device is configured to:
send, by the first data processing device, a transmitting payload to the second data processing unit through a first communication connection, wherein the transmitting payload can be divided into payload blocks and the first communication connection is realized between a first interface unit of the first data processing device and a first interface unit of the second data processing device;
send, by a first authentication unit of the first data processing device, a request to the first interface unit of the first data processing device, wherein the request requires data units in randomly selected positions of randomly selected and identifiable payload blocks;
send to the first interface unit of the second data processing device, by the first authentication unit of the first data processing device, the request through a second communication connection, wherein the second communication connection is realized between a second interface unit of the first data processing device and a second interface unit of the second data processing device;

extract, by a first authentication assembly of the first interface unit of the first data processing device, first response data from the transmitting payload based on the request;

receive, by the first authentication unit, the first response data from the first interface unit of the first data processing device;

receive, by the first authentication unit, a second response data from the second data processing device, wherein the second response data is extracted by a second authentication assembly of the second first interface unit from a receiving payload based on the request; and determine, by the first authentication unit, a successful check result if the first response data match the second response data.

* * * * *